(12) United States Patent
Sutarwala et al.

(10) Patent No.: US 9,083,198 B2
(45) Date of Patent: Jul. 14, 2015

(54) SYSTEM AND METHOD FOR WIRELESSLY CHARGING A RECHARGEABLE BATTERY

(75) Inventors: Taha Shabbir Husain Sutarwala, Mississauga (CA); David Gerard Rich, Waterloo (CA)

(73) Assignee: BlackBerry Limited, Waterloo (CA)

( * ) Notice: Subject to any disclaimer, the term of this patent is extended or adjusted under 35 U.S.C. 154(b) by 332 days.

(21) Appl. No.: 13/253,195

(22) Filed: Oct. 5, 2011

(65) Prior Publication Data
US 2013/0088191 A1    Apr. 11, 2013

(51) Int. Cl.
*H02J 7/00* (2006.01)
*H02J 7/02* (2006.01)
*H02J 5/00* (2006.01)

(52) U.S. Cl.
CPC ................ *H02J 7/025* (2013.01); *H02J 5/005* (2013.01)

(58) Field of Classification Search
USPC .......................................................... 320/108
See application file for complete search history.

(56) References Cited

U.S. PATENT DOCUMENTS

| | | | |
|---|---|---|---|
| 3,579,076 A * | 5/1971 | Herbst et al. .................. | 320/134 |
| 4,577,145 A * | 3/1986 | Mullersman .................. | 320/106 |
| 5,536,979 A * | 7/1996 | McEachern et al. .......... | 307/104 |
| 5,677,615 A * | 10/1997 | Takano et al. ................. | 320/152 |
| 6,028,413 A | 2/2000 | Brockmann | |
| 6,057,668 A | 5/2000 | Chao | |
| 6,184,651 B1 | 2/2001 | Fernandez et al. | |
| 6,340,879 B1 | 1/2002 | Blacker | |
| 6,781,346 B2 | 8/2004 | Reinhard et al. | |
| 7,042,196 B2 * | 5/2006 | Ka-Lai et al. ................. | 320/108 |
| 7,375,492 B2 | 5/2008 | Calhoon et al. | |
| 2001/0005127 A1* | 6/2001 | Takano et al. ................. | 320/150 |
| 2003/0085684 A1* | 5/2003 | Tsukamoto et al. .......... | 320/108 |
| 2004/0004547 A1* | 1/2004 | Appelt et al. ............... | 340/573.1 |
| 2005/0140482 A1* | 6/2005 | Cheng et al. .................. | 336/180 |
| 2007/0152639 A1* | 7/2007 | Miller ........................... | 320/150 |
| 2009/0015197 A1* | 1/2009 | Sogabe et al. ................ | 320/108 |
| 2009/0045772 A1 | 2/2009 | Cook et al. | |
| 2009/0048003 A1 | 2/2009 | Lu et al. | |
| 2009/0243541 A1 | 10/2009 | Jeong et al. | |
| 2009/0312046 A1 | 12/2009 | Clevenger et al. | |
| 2010/0136384 A1* | 6/2010 | Kreiner et al. .................. | 429/50 |
| 2011/0086256 A1 | 4/2011 | Julstrom et al. | |
| 2011/0309792 A1* | 12/2011 | Mochida et al. .............. | 320/108 |

FOREIGN PATENT DOCUMENTS

| | | |
|---|---|---|
| DE | 3620041 | 12/1987 |
| EP | 2325138 | 5/2011 |
| GB | 792319 | 3/1958 |
| WO | 2004014214 | 2/2004 |
| WO | 2010077759 | 7/2010 |

OTHER PUBLICATIONS

European Patent Office, Extended European Search Report for EP Patent App No. 11183915.5, May 16, 2012.

(Continued)

*Primary Examiner* — Arun Williams
(74) *Attorney, Agent, or Firm* — Geoffrey deKleine; Borden Ladner Gervais LLP

(57) ABSTRACT

A wireless charging system having a battery with at least one cell, a receiving coil wrapped around the at least one cell and a charger having a transmitting field designed to couple with the receiving coil of the battery. A battery is further described having at least one cell and having a receiving coil wrapped around at least one cell.

12 Claims, 4 Drawing Sheets

(56) References Cited

OTHER PUBLICATIONS

Harrist, Wireless Battery Charging System using Radio Frequency Energy Harvesting, Master's Thesis, University of Pittsburgh, 2004.

McConnel, Integrated RF Charing Tech Powers Battery, downloaded from http://www.eetasia.com/ART_8800567232_765245_NP_72798024.HTM, May 20, 2009.

Examiner's Report dated Oct. 10, 2014, issued from corresponding Canadian patent application No. 2,791,519.

* cited by examiner

SYSTEM AND METHOD FOR WIRELESSLY CHARGING A RECHARGEABLE BATTERY

FIELD

The present disclosure relates generally to batteries. More particularly, the present disclosure relates to a system and method for wirelessly charging a rechargeable battery.

BACKGROUND

Many portable electronic devices (such as mobile phones, portable DVD players, tablet computers, handheld televisions and portable music players) are being designed with thinner and smaller form factors. Many of these portable electronic devices include one or more batteries. The batteries are often rechargeable and may be replaceable (readily removable by a user, usually without specialized tools, and capable of ready replacement). While physically smaller, these portable electronic devices often require the same power or energy as their predecessors but have less internal area to dedicate to the battery. In response to the limited available space, batteries themselves are becoming smaller and thinner in order to meet the requirements of these form factors. Typically, these smaller batteries may produce and store less power. If smaller rechargeable batteries are used, or if power demands on the batteries are increased, these batteries may need to be recharged more frequently.

Within these devices, rechargeable batteries are often preferred by users over non-rechargeable batteries as rechargeable batteries typically need to be replaced less frequently and are more cost-effective. Conventional rechargeable batteries require an external power supply to recharge. In some cases, the portable electronic device will need to be plugged into this external power supply, such as an electrical socket. In other cases, the battery may be removed from the portable electronic device and charged in an external battery charger. Therefore, either the portable electronic device will not have power when the rechargeable battery is charging, or a user will require more than one rechargeable battery in order to continue to use the portable electronic device when one rechargeable battery is in the external battery charger.

BRIEF DESCRIPTION OF THE DRAWINGS

Embodiments of the present disclosure will now be described, by way of example only, with reference to the attached Figures.

Other aspects and features of the present disclosure will become apparent to those ordinarily skilled in the art upon review of the following description of specific embodiments in conjunction with the accompanying figures.

DETAILED DESCRIPTION

In one aspect, there is provided a system for wirelessly charging a rechargeable battery comprising a battery having at least one cell, an inductive element wrapped around the at least one cell of the battery, and a charger having a transmitting field designed to couple with the inductive element.

In another aspect, there is provided a battery comprising at least one cell and an inductive element wrapped around the at least one cell.

Described below are systems and methods by which a rechargeable battery of a portable electronic device may be wirelessly charged. These concepts are not limited to use with a portable electronic device, but may be applied to other less portable devices that still employ the use of a rechargeable battery. The concepts are illustrated and potentially advantageous in the context of a portable electronic device.

In the disclosure that follows, wirelessly charging is described in reference to coupling or mutual inductance, wherein energy is transferred from one medium, referred to as a transmitting element or transmitting field, to another inductive element sometimes referred to in the art as a receiving element or receiving coil. Coil is used herein as a term of art and the shape of the receiving element may not necessarily resemble the shape of a coil, and may be an inductive element designed to couple with a transmitting element such that energy is transferred from one element to the other. The receiving inductive element is explained in context of being housed within or integrated into a rechargeable battery for a portable electronic device. Furthermore, the concepts described herein may be applied to rechargeable batteries comprised of at least one cells.

Generally, the present disclosure provides a system and method for wirelessly charging a rechargeable battery. The battery may be inductively or wirelessly charged when the battery is coupled with a transmitting field or transmitting element.

Figure 1:
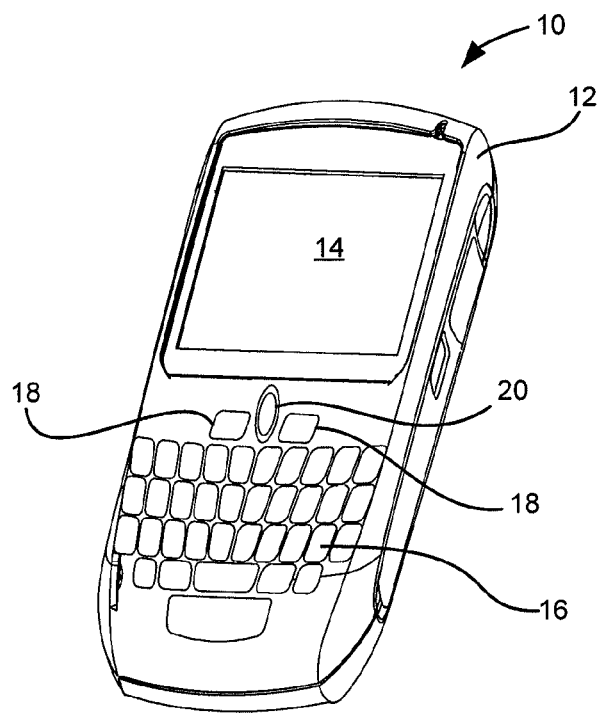
FIG. 1 is a perspective view of an illustrative portable electronic device.

FIG. 1 illustrates a perspective view of a portable electronic device 10 such as a mobile communication device. The portable electronic device 10 has a body 12, which generally serves as a structural framework for other components. The portable electronic device 10 further includes a display screen 14, a keyboard/keypad 16, a set of buttons 18 and an input device 20 such as a trackball, a joystick, scroll wheel, roller wheel, or touchpad or the likes. While not shown or described, the portable electronic device 10 includes other parts, which are used during operation of the device, such as an antenna. The portable electronic device 10 may be handheld, in that it is sized to be held or carried in a human hand.

Figure 2:
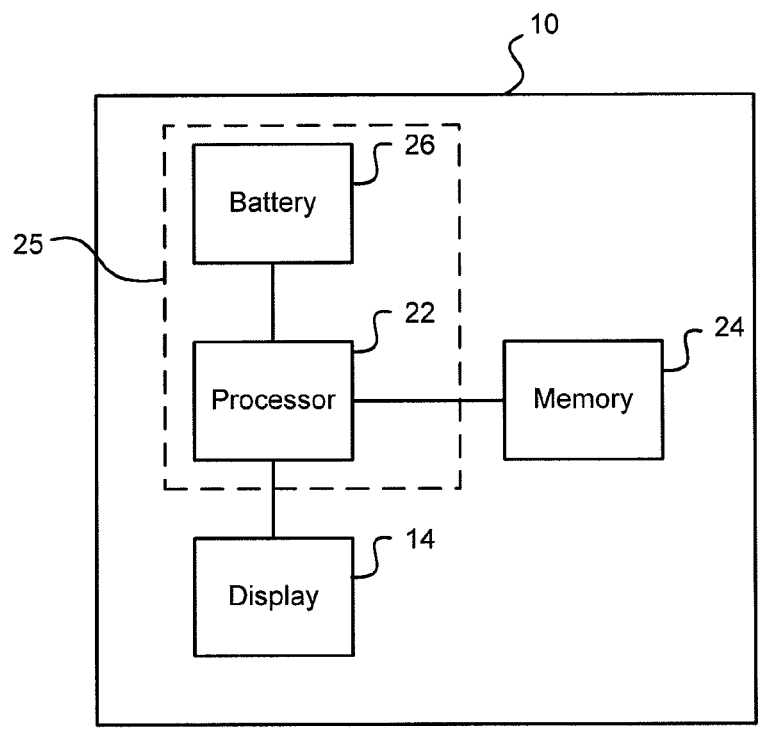
FIG. 2 is a schematic diagram a system for wirelessly charging a rechargeable battery.

The portable electronic device 10, similar to other electronic devices, contains various internal components, which are necessary for the execution of certain functionality. A schematic diagram of some components, including a system for wirelessly charging a rechargeable battery 25, is provided in FIG. 2. The system for wirelessly charging a rechargeable battery 25 includes a rechargeable battery 26 and a processor 22. In one embodiment, the processor 22 is the processor for the portable electronic device 10 however, the processor may be a stand-alone processor specific for the system for wirelessly charging the rechargeable battery 25. The system for wirelessly charging a rechargeable battery 25 is physically, or operatively, connected to the display 14 and a memory component 24 in that these components may function in concert. These components may be operatively connected even though they are not abutting or proximate to or physically connected to one another.

The display 14 of the portable electronic device 10 may be operatively connected to the processor 22 via, for example, internal wiring or cabling, and may display information to a user including, but not limited to, information associated with the battery 26 such as the rechargeable battery's charge level or charge status. The processor 22 may be operatively connected to the memory component 24, which may include both volatile and non-volatile memory. The memory component 24 may store information with respect to power requirements of applications and processes that run on the portable communication device 10. This information may be used by the power management integrated circuit (PMIC) (not shown) when determining the power needed to operate the portable electronic device. Alternatively, if the processor 22 is a standalone component of the system for wirelessly charging a rechargeable battery, the processor 22 may be operatively connect to a process for the portable electronic device 10 and information relating to or concerning the battery such as the battery's charge level or charge status, may be relayed or transmitted from the processor of the system to the processor of the portable electronic device.

A rechargeable battery has at least one cell, and more commonly a plurality of cells. When each cell is fully charged, the battery itself is fully charged, and as each cell drains of power the battery power is depleted and is required to be recharged. These cells interact with each other and provide the power or current to the portable electronic device. The PMIC may provide information to the battery in order for the current provided by the battery to be sufficient to run the components and process on the portable electronic device. In an alternative, the rechargeable battery may request or pull this information from the PMIC. In a further alternative, the PMIC may be operatively connected with the processor 22 which may relay the required power information to the battery, or if the system for wirelessly charging a rechargeable battery 25 comprises a stand alone processor component the processor of the portable electronic device may provide current and power information to the processor of the system for wirelessly charging a rechargeable battery 25 in order for the requisite power to be provided to the portable electronic device.

Figure 3:
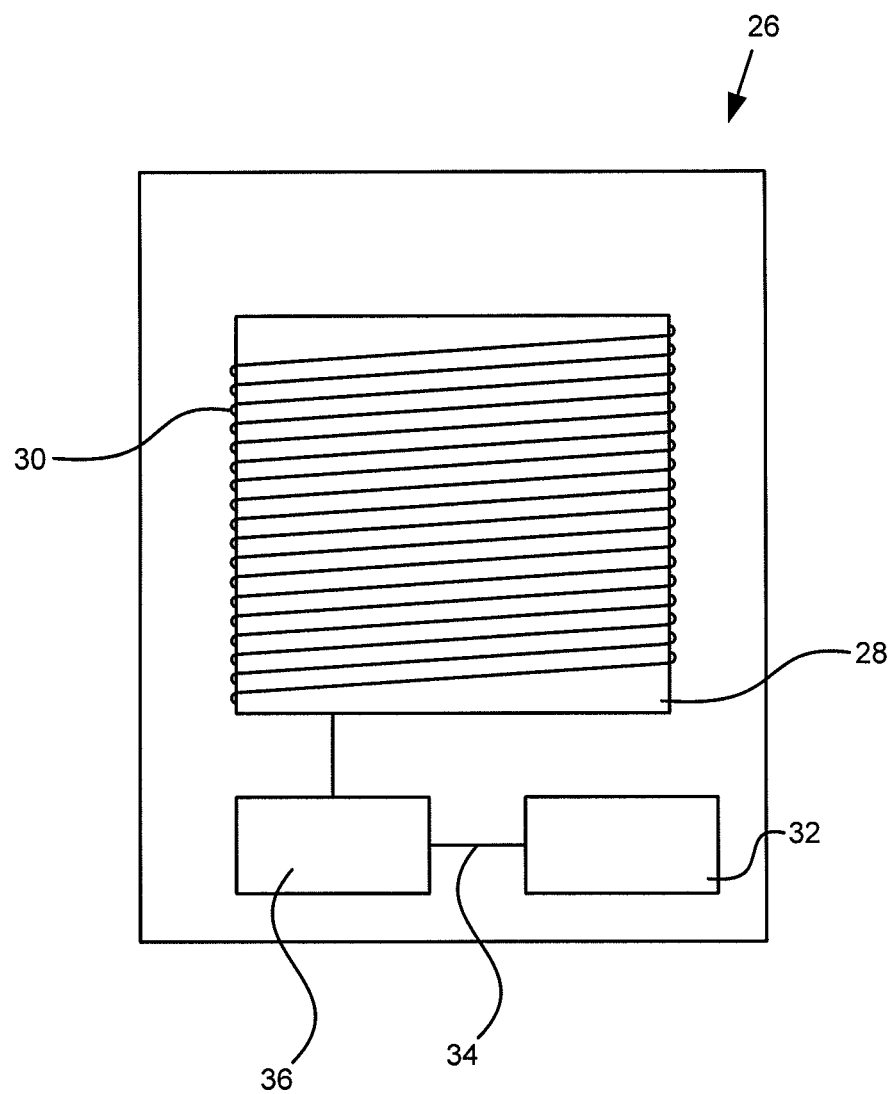
FIG. 3 is a schematic diagram of an illustrative battery.

In one embodiment, as shown in FIG. 3, the battery 26 includes a single cell 28. In one particular case, an inductive element 30, such as a receiving element or receiving coil, is wrapped around the single cell 28. Generally speaking, the coil is wrapped around the cell 28 in the sense that the turns of the coil encircle the general frame or contours of the cell. The inductive element is referred to as a receiving element as it is designed to receive energy by means of inductive coupling. The inductive element 30 assists in the process of wirelessly charging the battery when the portable electronic device 10 is coupled with a transmitting or charging element (not shown in FIG. 3). The system for wirelessly charging the rechargeable battery 25 may further include a printed circuit board (PCB) 32 and a set of circuitry 34, with the circuitry 34 being connected to the PCB 32. The inductive element 30 is designed to be tightly wrapped around the cell 28 of the battery 26. In this sense, tightly wrapped means that the inductive element 30 encircles the cell tight enough as to not uncoil or unravel, but not so tightly as to damage the cell 28 of the rechargeable battery. The inductive element is operatively connected to the PCB 32 and the circuitry 34, in that the circuitry 34 may direct the energy received by the inductive element 30 to the cell 28 of the rechargeable battery 26. The battery's circuitry 34 is further operatively connected to the processor 22 in order to transmit information relating to the power remaining in the battery 26 or the appropriate level of current that needs to be drawn from the battery 26 to power the operating components within the device. The circuitry 34 may be directly connected to the processor 22 of the portable electronic device or may be connected to a standalone processor with the system for wirelessly charging the rechargeable battery or may be connected to the PMIC. In these embodiments, the standalone processor or the PMIC may be operatively connected to the processor of the portable electronic device.

The system for wirelessly charging a rechargeable battery may include a temperature sensor 36 located proximate to the cell 28 of the battery 26. The temperature sensor may be any kind of temperature sensor or thermometer in that it is designed to monitor the temperature of the battery and generate electrical signals as an output. The temperature sensor may be operatively connected to the battery circuitry 34 which may relay these signals to the processor 22. In the alternative, if the system for wirelessly charging a rechargeable battery comprises a standalone processor, the temperature sensor 36 may be operatively connected to the processor via, for example, internal wiring, cabling, or wireless communication link.

The processor 22 and the circuitry 34 may control the power delivered by the inductive element 30. Controlling the transfer of energy of the inductive element 30 to the battery 26 is intended to improve battery performance by way of temperature control. The temperature of a battery can affect the chemical reactions internal to the battery, which allow the battery to produce energy. Faster chemical reactions will occur in a hotter battery, thus providing an increased performance. A hotter battery, with faster chemical reactions, may also suffer from a higher rate of unwanted chemical reactions which may reduce the life time of a battery. As such, there is a relationship between temperature and the rate at which chemical reactions occur. It has been shown that this relationship, or function between temperature and rate at which chemical reactions is an exponential relations such that as temperature rises, the rate increase exponentially. For example, for every 10 degree Celsius increase, the rate of chemical reactions roughly doubles. Temperature thus affects battery performance and managing the temperature of the battery is intended to improve battery performance.

In one embodiment, the temperature sensor 36 may be calibrated to detect whether or not the temperature of the battery 26 has fallen below a minimum temperature threshold or risen above a maximum temperature threshold. In an alternative embodiment, a thermistor within the battery 26 may be used for temperature sensing or a discrete temperature sensor may be used. The minimum temperature threshold and maximum temperature threshold may be preprogrammed into the system for wirelessly charging a rechargeable battery and may depend on the cell chemistry and architecture of the battery 26. A desired temperature range may also be programmed into the system and may be determined based on a desired rate of chemical reactions, such that the performance of the battery is increased, but the temperature of the battery is not so high as to have an excessive rate of unwanted chemical reactions. For example, with a lead-acid battery, the desired operating temperature may be between 15 degrees Celsius and 25 degrees Celsius, so a minimum threshold might be set at 15 degrees Celsius and a maximum threshold may be set at 25 degrees Celsius, with the desirable range being between 15 and 25 degrees Celsius. In a preferred embodiment, charging of the battery occurs between 15 and 40 deg C., and discharging of the battery occurs between 10 and 40 degrees Celsius.

The temperature sensor 36 may be programmed to sample the battery 26 or cell 28 temperature at particular intervals, for example every millisecond or every second, and thereby generate a plurality of temperature signals that are relayed to the processor 22. In an alternative, the temperature sensor 36 monitors the battery's temperature continuously and may be programmed, such that, in the event the temperature has fallen below a minimum threshold or risen above a maximum threshold, the temperature sensor 36 will generate a temperature signal and transmit the temperature signal to the processor 22, either directly or through the use of the battery's circuitry 34. The temperature signal may act as an interrupt, such that on receipt of the temperature signal by the processor 22, an interrupt event is triggered. In another alternative, the temperature sensor 36 may sample the battery's temperature at a sampling rate controlled by the processor 22, in that the sampling frequency is under the control of the processor 22. In a further alternative, the temperature sensor 36 may monitor the temperature of the battery continuously. In yet another alternative, the temperature sensor 36 may not determine if the temperature is above a maximum threshold or below a minimum threshold, but the processor 22 compares a received temperature signal from the temperature sensor 36 to determine if the temperature of the battery is in the desirable temperature range.

For example, if the battery 26 is operating at a low ambient temperature, where low ambient implies a temperature below the minimum temperature threshold, the sensor may signal the processor that the battery 26 temperature is lower than a desired temperature. The processor 22 may then signal the inductive element 30, coiled around the battery 26, to couple with a transmitting field. Once coupled, the inductive element 30 may begin to warm up and with heat radiating from the inductive element coiled around the battery 26, the battery's temperature begins to rise. The temperature sensor 36 continues to detect the battery temperature. Once the temperature sensor 36 detects that the temperature of the battery is in a desired range, the temperature sensor may send another temperature signal to the processor 22. The processor may then signal the inductive element 30 to terminate the charging. In an alternative, once the inductive element 30 couples with the transmitting field, the temperature sensor may increase the sampling rate of the battery 26 and may transmit a plurality of temperature signals to the processor 22.

In one embodiment, when the battery is outside the desired range, the charging can either be slowed down to be performed in steps until the battery temperature is within desired range, or charging can be switched off and started when temperature is in desired range. To control the charging the battery may be monitored at all times.

If the temperature of the battery 26 is found to be below the minimum temperature threshold, and the inductive element 30 is unable to couple with a transmitting element, the processor may transmit a message, such as a text message or icon shown on the display 14 to alert a user that the battery is operating below a desired temperature and the portable electronic device should be brought into proximity of the transmitting field. The message may instead by in the form of an audible alert.

The proximity of the transmitting field will change with respect to the type of wireless charging being used. Induction charging may require close proximity in that the charge and portable electronic device are touching or within a few centimeters of each other. Near field charging has a larger transmitting field in comparison to induction charging. The portable electronic device and charger may be further apart in the order of 1 to 2 meters. Far field charging may have a still larger transmitting field which may allow transmitting of the charge over 2 meters.

Figure 4:
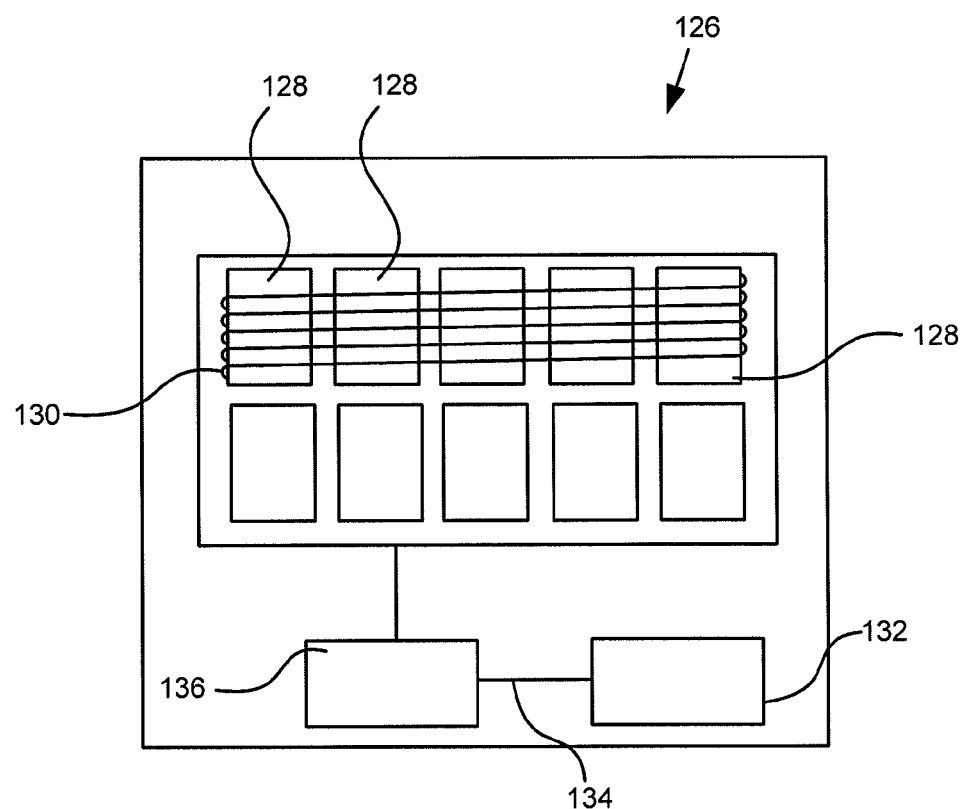
FIG. 4 is a schematic diagram of another illustrative battery.

In another illustrative embodiment of the system for wirelessly charging a rechargeable battery, as shown in FIG. 4, the battery 126 comprises a plurality of cells 128. The plurality of cells may also be arranged in a stacked relationship or may be arranged side-by-side as shown. An inductive element 130 is wound around a subset of the plurality of cells 128. The subset may be the whole set, in which all of the plurality of cells 128 are wrapped by the inductive element or the subset may be less than all of the plurality of cells 128 where some of the cells are coiled in the inductive element 130, while other cells may not. The cells 128, whether wrapped in the inductive element 130 or outside the indicative element 130 are operatively connected to one another to provide power to the portable electronic device 10 as directed by the processor 22 and PMIC. The cells 128 are further connected to a PCB 132 and circuitry 134 of the battery 126 and the PCB and circuitry are operatively connected to the processor 22. The processor may be the processor of the portable communication device or may be a standalone processor of the system for wirelessly charging a rechargeable battery. A temperature sensor 136 is operatively connected to both the battery 126 and the circuitry 134. In an alternative, the temperature sensor may be operatively connected directly to the processor 22. The inductive element 130, in either the arrangement shown in FIG. 4 or in a stacked relationship, may improve the structural robustness of the battery as the cells 128 within the coil of the inductive element 130 as the cells 128 will be held in place and in close proximity to one another by the inductive element 130.

As described above, in one embodiment the temperature sensor may monitor the temperature of the battery 128. If the battery's temperature is found to be below the minimum temperature threshold, the processor may signal the inductive element 130 to couple with the transmitting field, which is intended to allow the inductive element 130 to increase in temperature. The increase in temperature of the inductive element radiates heat to the cells 128 of the battery 126, increasing the temperature of the battery to a more desirable range.

The batteries as shown in FIGS. 3 and 4 are intended to be part of a wirelessly charging battery with improved coupling abilities while not greatly increasing the dimensions or footprint of the battery. Inductive or wireless charging is improved when the inductive element is aligned or in a stacked relationship with the transmitting field (not shown). Once removed from this relationship the wireless charging system may experience degradation in the power transmission between the transmitting field and receiving indicative element.

Figure 5:
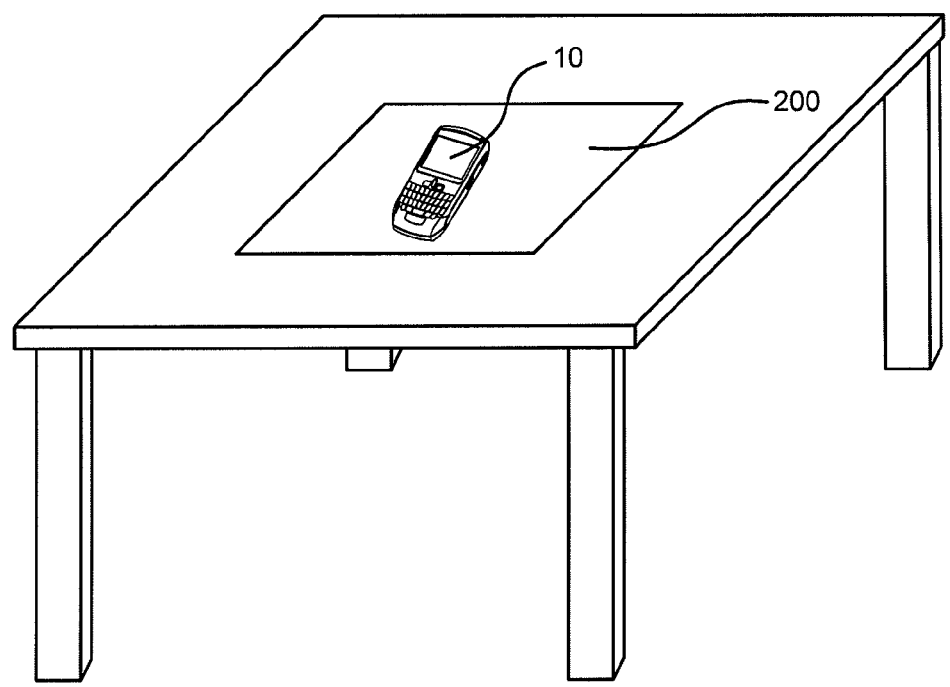
FIG. 5 is a schematic diagram of a wireless charging system in a charging position.

FIG. 5 illustrates the portable electronic device 10 in a charging relationship with a transmitting field located within a charger 200 or transmitting field. The presence of the inductive element wrapped around at least one cell of the battery is intended to aid in the coupling of the receiving inductive element and the transmitting field, in that a stacked relationship is maintained between the coupled elements. A stacked relationship has been shown to improve the efficiency of a wireless charging system. By setting the portable communication device on the charger 200, the battery and thus the coiled inductive element is intended to remain in an aligned relationship with the transmitting field. As the battery lies flat in conventional portable electronic devices, the inductive element, wrapped around the battery will also remain in stacked orientation with the transmitting field.

Wireless energy transfer or wireless charging takes place where energy is transmitted from the charger 200 to the battery, via the inductive element. Wireless charging may be accomplished using inductive charging. Referring to FIG. 5, inductive charging occurs when the charger 200 creates an alternating electromagnetic field and the inductive element within the portable electronic device receives and converts the electromagnetic field back to electrical current to charge the battery. In a preferred embodiment, the charger and the receiving coil are in close proximity and on a common axis.

Other wireless transmission techniques, such as near-field and far-field methods are also contemplated. In near-field transmission, the energy transfer may travel a distance a few times the diameter of the wireless charging elements. Near-field transfer is typically a magnetic or inductive transfer, as described above, but electric or capacitive energy transfer may also be possible. Far-field methods of wireless energy transfer may achieve much longer ranges. Electromagnetic radiation in the far-field can be made to match the shape of the receiving element, thus allowing a significant portion of the emitted power at long ranges. Depending on the wireless transmission technique used, the receiving inductive element may vary in shape or the number of coils or times the inductive element is wrapped around at least one cell of the battery may increase or decrease. Inductive element charging may be aided by a proximity sensor to enable more effective charging. In the preferred embodiment, proximity sensors present in the device are used The wireless transmitting and receiving elements may be any of a single transmitter and single receiver, multiple transmitters and a single receiver, a single transmitter and multiple receivers, or multiple transmitters and multiple receivers.

Figure 6:
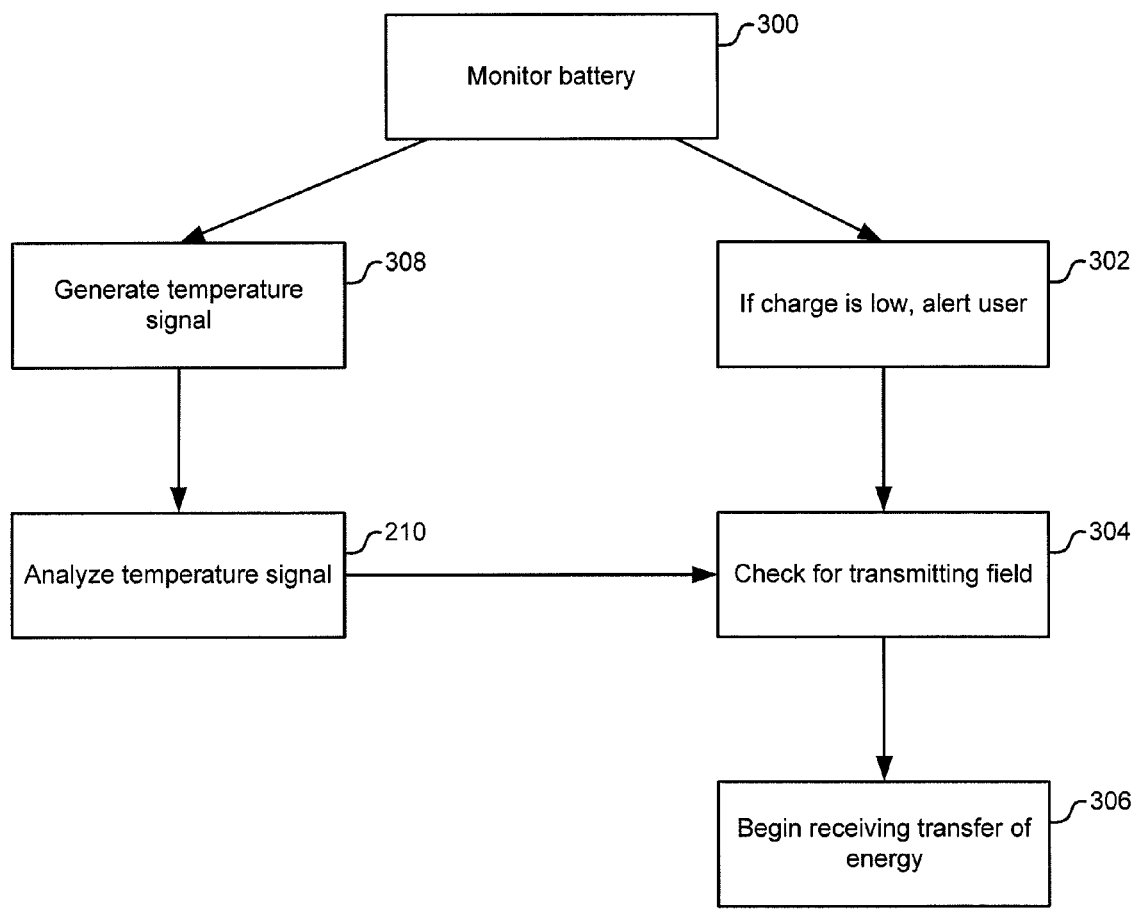
FIG. 6 is a flowchart of a method for wirelessly charging a rechargeable battery.

FIG. 6 illustrates a flowchart for one illustrative method for wirelessly charging a rechargeable battery with respect to the battery illustrated in FIG. 3. For the purposes of illustration, it will be assumed that the method is carried out by the processor 22 although the concepts may be applied to embodiments in which various functions are performed by or in concert with other components. At the outset, the processor may control the temperature sensor 36 at a first sampling rate and the processor may further monitor 300 the temperature level and the charge level of the battery. If the processor determines 302 a charge level to be low, the processor will initiate a user alert. The alert may be in the form of a text message or icon shown on the display 14 or may be in the form of an audible alert. Although the system for wirelessly charging a rechargeable battery may check 304 for a transmitting field at regular intervals, the sampling frequency may be increased by the processor when the battery charge level has been found to be low. The sampling rate may return to a lower sampling rate once the charge level has reached a less critical level or once the battery is fully charged.

Once the transmitting field of the charger has been detected, the inductive element 30 couples 306 with the transmitting field of the charger and begins to receive and convert energy to increase the charge level of the battery. The processor will continue to monitor 300 the charge level and temperature level of the battery throughout the charging process.

If the temperature sensor 36, during charging or at another time, samples a temperature that is outside the desirable temperature range, a temperature signal will be generated 308 and will be transmitted to the processor 22. The processor 22 analyzes 310 the temperature signal and may increase the temperature sampling rate to a second sampling rate which is higher than the first sampling rate. If the temperature sensor has sensed the temperature of the battery 26 to be below a minimum temperature threshold, the processor 22 may initiate similar processes as if the battery's charge were low. In particular, the system for wirelessly charging a rechargeable battery 26 may check 304 for the transmitting field and, if the transmitting field is found, initiates charging 306 by coupling the inductive element 30 with the transmitting field so that the conductive element begins to produce heat which may radiate to the cells of the battery, increasing the temperature of the battery 26.

If the temperature sensed by the temperature sensor 36 is above the maximum temperature threshold, the processor, after analyzing 310 the temperature signal, may take steps to lower the temperature such as uncoupling the inductive element from the transmitting field. By uncoupling, the transfer of energy is ended, which is intended to gradually reduce the heat radiating form the inductive element wrapped around the battery. Without the added heat provided by the inductive element, the battery's temperature may fall and return to a temperature within the desirable temperature range. Alternatively, the receiving element or coil may be part of a heat sink path to cool down the battery, where the receiving coil is made of thermally conductive material. With favourable positioning of the metal contact, such as a logo on the battery door that connects (touches) with the receiving coil or some other thermally conductive part that is connected to the receiving coil, the heat can flow outwards of the device on to a larger surface (battery door), thus cooling the battery faster. Also, if inductive or closely coupled charging is used, then the battery may be cooled as the heat can be conducted to the charging pad (transmitter) which can act as the heat sink.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A system for wirelessly charging a rechargeable battery comprising:
    a battery having at least one cell;
    an inductive element wrapped around the at least one cell of the battery;
    a charger having a transmitting field designed to couple with the inductive element;
    a temperature sensor configured to generate a temperature signal;

a processor operatively connected to the temperature sensor and the inductive element, the processor configured to:
  determine if the temperature of the battery is below a predetermined temperature range, based on the temperature signal; and
  in response to determining the temperature of the battery is below the predetermined temperature range:
    signal the inductive element to couple with the transmitting field to increase the temperature of the battery by heat radiating from the inductive element;
    continue to detect the temperature of the battery while the inductive element is coupled with the transmitting field; and
    in response to determining that the temperature of the battery is within a predetermined range, signal the inductive element to uncouple with the transmitting field to discontinue heating the battery.

2. The system of claim 1 wherein the at least one cell is a plurality of stacked cells.

3. The system of claim 1 wherein the at least one cell is a plurality of cells in side by side relationship.

4. The system of claim 1 wherein the processor is configured to increase a sampling rate of the temperature sensor when the processor signals to the inductive element to couple with the transmitting field.

5. The system of claim 1 wherein an alert is provided to the user when the inductive element is unable to couple with the transmitting field.

6. The system of claim 1 further comprising a heat sink, wherein the heat sink is thermally coupled to the inductive element to provide a path for heat discharge.

7. A battery comprising:
  at least one cell;
  an inductive element wrapped around the at least one cell;
  a temperature sensor configured to generate a temperature signal; and
  a processor operatively connected to the temperature sensor and the inductive element, the processor configured to:
    determine if the temperature of the battery is below a predetermined temperature range, based on the temperature signal; and
    in response to determining the temperature of the battery is below the predetermined temperature range:
      signal the inductive element to couple with the transmitting field of a charger to increase the temperature of the battery by heat radiating from the inductive element;
      continue to detect the temperature of the battery while the inductive element is coupled with the transmitting field; and
      in response to determining that the temperature of the battery is within a predetermined range, signal the inductive element to uncouple with the transmitting field to discontinue heating the battery.

8. The battery of claim 7 wherein the at least one cell is a plurality of stacked cells.

9. The battery of claim 7 wherein the at least one cell is a plurality of cells in side by side relationship.

10. The battery of claim 7 wherein the processor is configured to increase a sampling rate of the temperature sensor when the processor signals to the inductive element to couple with the transmitting field.

11. The battery of claim 7 wherein an alert is provided to the user when the inductive element is unable to couple with the transmitting field.

12. The battery of claim 7 further comprising a heat sink, wherein the heat sink is thermally coupled to the inductive element to provide a path for heat discharge.

* * * * *